United States Patent
Devarapalli et al.

(10) Patent No.: US 9,832,671 B2
(45) Date of Patent: Nov. 28, 2017

(54) MODELING RADIO ACCESS NETWORKS

(75) Inventors: Vijay Devarapalli, Los Altos, CA (US);
Nery Strasman, Ramat Gan (IL); Ren Finley, San Jose, CA (US)

(73) Assignee: VASSONA NETWORKS, San Jose, CA (US)

( * ) Notice: Subject to any disclaimer, the term of this patent is extended or adjusted under 35 U.S.C. 154(b) by 19 days.

(21) Appl. No.: 13/233,043

(22) Filed: Sep. 15, 2011

(65) Prior Publication Data

US 2012/0087260 A1    Apr. 12, 2012

Related U.S. Application Data

(60) Provisional application No. 61/383,414, filed on Sep. 16, 2010.

(51) Int. Cl.
| | |
|---|---|
| *H04W 24/08* | (2009.01) |
| *H04W 92/14* | (2009.01) |
| *H04W 36/00* | (2009.01) |
| *H04W 36/30* | (2009.01) |

(52) U.S. Cl.
CPC ........ *H04W 24/08* (2013.01); *H04W 36/0027* (2013.01); *H04W 36/30* (2013.01); *H04W 92/14* (2013.01)

(58) Field of Classification Search
CPC ..... H04L 36/00–36/385; H04W 36/00–36/385
USPC ................ 370/229–235, 252–253, 328–329, 370/331–335, 342, 351–356, 441; 455/403, 405, 422.1–425, 436–444, 446, 455/450–453
See application file for complete search history.

(56) References Cited

U.S. PATENT DOCUMENTS

| | | | |
|---|---|---|---|
| 6,385,673 B1 | 5/2002 | DeMoney | |
| 6,697,378 B1* | 2/2004 | Patel | 370/468 |
| 7,698,432 B2 | 4/2010 | Short | |
| 8,205,004 B1 | 6/2012 | Kaufman | |
| 8,369,353 B1* | 2/2013 | Habib et al. | 370/464 |
| 2003/0067872 A1 | 4/2003 | Harrell et al. | |
| 2004/0203825 A1 | 10/2004 | Cohen | |
| 2005/0114538 A1 | 5/2005 | Rose | |
| 2005/0148314 A1* | 7/2005 | Taglienti et al. | 455/403 |
| 2005/0204046 A1 | 9/2005 | Watanabe | |
| 2005/0227720 A1* | 10/2005 | Gunaratnam et al. | 455/510 |
| 2006/0084445 A1* | 4/2006 | Minami | H04W 28/08 455/452.1 |
| 2007/0117563 A1* | 5/2007 | Terry et al. | 455/434 |
| 2007/0268859 A1* | 11/2007 | Yao et al. | 370/328 |
| 2008/0212480 A1 | 9/2008 | Shimonishi | |
| 2009/0327079 A1 | 12/2009 | Parker et al. | |
| 2010/0034089 A1* | 2/2010 | Kovvali et al. | 370/235 |
| 2010/0074275 A1 | 3/2010 | Sahai | |

(Continued)

OTHER PUBLICATIONS

Network Security Appliance, NEXCOM. 2017.
Merriam Webster dictionary, 2017.

*Primary Examiner* — Eric Myers
(74) *Attorney, Agent, or Firm* — Reches Patents

(57) ABSTRACT

A method, a computer program product and a device, the method is for evaluating a state of a radio access network (RAN), and may include parsing control plane massages that are exchanged between the RAN and a core network that is coupled to the RAN; and determining, by an edge bandwidth manager, a current state of the RAN based on the control plane massages.

12 Claims, 9 Drawing Sheets

(56) References Cited

U.S. PATENT DOCUMENTS

| | | |
|---|---|---|
| 2010/0131671 A1 | 5/2010 | Kohli et al. |
| 2010/0151899 A1* | 6/2010 | Lekutai ............... 455/550.1 |
| 2010/0195602 A1 | 8/2010 | Kovvali et al. |
| 2011/0032898 A1* | 2/2011 | Kazmi et al. ............ 370/329 |
| 2011/0082924 A1 | 4/2011 | Gopalakrishnan |
| 2011/0145726 A1 | 6/2011 | Wei et al. |
| 2011/0197239 A1 | 8/2011 | Schlack |
| 2011/0235595 A1* | 9/2011 | Mehta et al. ............ 370/329 |
| 2012/0039191 A1* | 2/2012 | Foster et al. ............ 370/252 |
| 2012/0052866 A1 | 3/2012 | Froehlich et al. |
| 2012/0087260 A1 | 4/2012 | Devarapalli |
| 2013/0016620 A1 | 1/2013 | Den Hartog et al. |
| 2013/0163428 A1 | 6/2013 | Lee |
| 2016/0212754 A1 | 7/2016 | Mendiola |

* cited by examiner

Intercepting or receiving control plane messages that are exchanged between the RAN and a core network that is coupled to the RAN. 510

Intercepting the control plane messages by a probe and sending the control plane messages from the probe to the edge bandwidth manager. 512

Receiving the control plane messages from an aggregator. 514

Parsing the control plane massages (that were exchanged between the RAN and the core network). 520

Determining, by an edge bandwidth manager, a current state of the RAN based on the control plane massages. 530

MODELING RADIO ACCESS NETWORKS

RELATED APPLICATIONS

This application claims the priority of U.S. provisional patent filing date Sep. 16, 2010, Ser. No. 61/383,414, which is incorporated herein by reference.

BACKGROUND OF THE INVENTION

Third Generation (3G) Wireless Networks 3G wireless networks may interface with external networks such as the internet. Third generation (3G) wireless networks have a General Packet Radio Service (GPRS) core network that facilitates the transmission of Internet Protocol (IP) packets between the 3G wireless network and the internet. The GPRS core network may use a GPRS tunneling protocol that allows users of the 3G wireless network to be coupled to external networks while moving from one location to the other. The GPRS may include various components such as the Service GPRS Support Node (SGSN) and Gateway GPRS Support node (GGSN). The SGSN can interface with a Radio Network Controller (RNC).

The functionality of the different 3G wireless network components is known in the art and defined in various known standards. One non-limiting explanation relating to the SGSN, the RNC and the GGSN can be found in www.wikipedia.org.

Gateway GPRS Support Node (GGSN)—The Gateway GPRS Support Node (GGSN) is a main component of the GPRS network. The GGSN is responsible for the interworking between the GPRS network and external packet switched networks, like the Internet and X.25 networks. From an external network's point of view, the GGSN is a router to a sub-network, because the GGSN 'hides' the GPRS infrastructure from the external network.

When the GGSN receives data addressed to a specific user, it checks if the user is active. If it is, the GGSN forwards the data to the SGSN serving the mobile user, but if the mobile user is inactive, the data is discarded. On the other hand, mobile-originated packets are routed to the right network by the GGSN. The GGSN is the anchor point that enables the mobility of the user terminal in the GPRS/UMTS networks. In essence, it carries out the role in GPRS equivalent to the Home Agent in Mobile IP. It maintains routing necessary to tunnel the Protocol Data Units (PDUs) to the SGSN that service a particular MS (Mobile Station).

The GGSN converts the GPRS packets coming from the SGSN into the appropriate packet data protocol (PDP) format (e.g., IP or X.25) and sends them out on the corresponding packet data network. In the other direction, PDP addresses of incoming data packets are converted to the GSM address of the destination user. The readdressed packets are sent to the responsible SGSN. For this purpose, the GGSN stores the current SGSN address of the user and his or her profile in its location register. The GGSN is responsible for IP address assignment and is the default router for the coupled user equipment (UE). The GGSN also performs authentication and charging functions. Other functions include subscriber screening, IP Pool management and address mapping, QoS and PDP context enforcement. With LTE scenario the GGSN functionality moves to SAE gateway (with SGSN functionality working in MME).

Serving GPRS Support Node (SGSN)—a Serving GPRS Support Node (SGSN) is responsible for the delivery of data packets from and to the mobile stations within its geographical service area. Its tasks include packet routing and transfer, mobility management (attach/detach and location management), logical link management, and authentication and charging functions. The location register of the SGSN stores location information (e.g., current cell, current VLR) and user profiles (e.g., IMSI, address or addresses) used in the packet data network) of all GPRS users registered with this SGSN components.

Radio Network Controller (RNC)—the RNC is a governing element in the UMTS radio access network (UTRAN) and is responsible for controlling the Node Bs that are coupled to it. The RNC carries out radio resource management, some of the mobility management functions and is the point where encryption is done before user data is sent to and from the mobile. The RNC connects to the Circuit Switched Core Network through Media Gateway (MGW) and to the SGSN (Serving GPRS Support Node) in the Packet Switched Core Network. The logical connections between the network elements are known as interfaces.

The interface between the RNC and the Circuit Switched Core Network (CS-CN) is called Iu-CS and between the RNC and the Packet Switched Core Network is called IuPS. Other interfaces include Iub (between the RNC and the Node B) and Iur (between RNCs in the same network). Iu interfaces carry user traffic (such as voice or data) as well as control information Iur interface is mainly needed for soft handovers involving 2 RNCs though not required as the absence of Iur will cause these handovers to become hard handovers . . . ub, Iu and Iur protocols all carry both user data and signaling (that is, control plane).

Signaling protocol responsible for the control of the Node B by the RNC is called NBAP (Node-B Application Part). NBAP is subdivided into Common and Dedicated NBAP (C-NBAP and D-NBAP), where Common NBAP controls overall Node B functionality and Dedicated NBAP controls separate cells or sectors of the Node B. NBAP is carried over Iub. In order for NBAP to handle common and dedicated procedures, it is divided into: NodeB Control Port (NCP) which handles common NBAP procedures and Communication Control Port (CCP) which handles dedicated NBAP procedures. Control plane protocol for the transport layer is called ALCAP (Access Link Control Application Protocol).

Basic functionality of ALCAP is multiplexing of different users onto one AAL2 transmission path using channel IDs (CIDs). ALCAP is carried over Iub and Iu-CS interfaces. Signaling protocol responsible for communication between RNC and the core network is called RANAP (Radio Access Network Application Part), and is carried over Iu interface. Signaling protocol responsible for communications between RNCs is called RNSAP (Radio Network Subsystem Application Part) and is carried on the Iur interface.

Forth Generation (4G) Wireless Networks 4G networks can include a RAN that in turn may include components such as the enhanced Node B (eNodeB) that is the hardware that is coupled to the mobile phone network that communicates directly with mobile handsets.

4G networks can have a System Architecture Evolution (SAE) architecture. The SAE has a flat, all-IP architecture with separation of control plane and user plane traffic (www.wikipedia.org). The main component of the SAE architecture is the Evolved Core network (EPC), also known as SAE Core. The EPC will serve as equivalent of GPRS networks (via the Mobility Management Entity, Serving Gateway and PDN Gateway subcomponents).

FIG. 1 illustrates a prior art 4G network that is coupled to the Internet 230 and to a user equipment (UE) 210. It is noted that multiple UEs are coupled to the 4G network and are arranged in cells. The prior art 4G wireless network includes eNodeB 212, ePDG (Evolved Packet Data Gateway) 216, ANDSF (Access Network Discovery and Selection Function) 214, MME (Mobility Management Entity) 218, SGW (Serving Gateway) 220, HSS (Home Subscriber Server) 222 and PGW (PDN Gateway) 224.

FIG. 1 illustrates UE 210 as being coupled to eNodeB 212 and to ePDG 216, eNodeB 212 and ePDG 216 as being coupled to SGW 220. PGW 224 as being coupled between SGW 220 and the Internet 230, and MME 218 as being coupled between HSS 222 and eNodeB 212.

MME 218 is the key control-node for the LTE access-network. It is responsible for idle mode UE (User Equipment) tracking and paging procedure including retransmissions. It is involved in the bearer activation/deactivation process and is also responsible for choosing the SGW 220 for a UE at the initial attach and at time of intra-LTE handover involving Core Network (CN) node relocation. It is responsible for authenticating the user (by interacting with the HSS).

The Non Access Stratum (NAS) signaling terminates at the MME 218 and it is also responsible for generation and allocation of temporary identities to UEs. It checks the authorization of the UE to camp on the service provider's Public Land Mobile Network (PLMN) and enforces UE roaming restrictions. The MME 218 is the termination point in the network for ciphering/integrity protection for NAS signaling and handles the security key management. Lawful interception of signaling is also supported by the MME 218. The MME 218 also provides the control plane function for mobility between LTE and 2G/3G access networks with the S3 interface terminating at the MME 218 from the SGSN. The MME 218 also terminates the S6a interface towards the home HSS 222 for roaming UEs.

SGW 220 routes and forwards user data packets, while also acting as the mobility anchor for the user plane during inter-eNodeB handovers and as the anchor for mobility between LTE and other 3GPP technologies (terminating S4 interface and relaying the traffic between 2G/3G systems and PGW 224). For idle state UEs, the SGW 220 terminates the DL data path and triggers paging when DL data arrives for the UE. It manages and stores UE contexts, e.g. parameters of the IP bearer service, network internal routing information. It also performs replication of the user traffic in case of lawful interception.

PGW 224 provides connectivity from the UE to external packet data networks by being the point of exit and entry of traffic for the UE. A UE may have simultaneous connectivity with more than one PGW 224 for accessing multiple PDNs. The PGW 224 performs policy enforcement, packet filtering for each user, charging support, lawful Interception and packet screening. Another key role of the PGW 224 is to act as the anchor for mobility between 3GPP and non-3GPP technologies such as WiMAX and 3GPP2 (CDMA 1X and EvDO).

HSS 222 is a central database that contains user-related and subscription-related information. The functions of the HSS 222 include functionalities such as mobility management, call and session establishment support, user authentication and access authorization. The HSS is based on pre-Rel-4 Home Location Register (HLR) and Authentication Center (AuC).

ANDSF 214 provides information to the UE about connectivity to 3GPP and non-3GPP access networks (such as Wi-Fi). The purpose of the ANDSF 214 is to assist the UE to discover the access networks in their vicinity and to provide rules (policies) to prioritize and manage connections to these networks.

ePDG 216—the main function of the ePDG 216 is to secure the data transmission with a UE coupled to the EPC over an untrusted non-3GPP access. For this purpose, the ePDG 216 acts as a termination node of IPsec tunnels established with the UE.

Non Access Stratum (NAS) Protocols—The non-access stratum (NAS) protocols form the highest stratum of the control plane between the user equipment (UE) and MME. NAS protocols support the mobility of the UE and the session management procedures to establish and maintain IP connectivity between the UE and a PDN GW. They define the rules for a mapping between parameters during inter-system mobility with 3G networks. They also provide the NAS security by integrity protection and ciphering of NAS signaling messages. EPS provides the subscriber with a "ready-to-use" IP connectivity and an "always-on" experience by linking between mobility management and session management procedures during the UE attach procedure Complete NAS transactions consist of specific sequences of elementary procedures with EPS Mobility Management (EMM) and EPS Session Management (ESM) protocols.

The MME protocol stack consists of S1-MME stack to support S1-MME interface with eNodeB 212 and S11 stack to support S11 interface with Serving Gateway. MME 218 supports the S1 interface with eNodeB 212. The integrated S1 MME interface stack consists of IP, SCTP and S1AP.

SCTP (Stream Control Transmission Protocol) is a common transport protocol that uses the services of Internet Protocol (IP) to provide a reliable datagram delivery service to the adaptation modules, such as the S1AP. SCTP provides reliable and sequenced delivery on top of the existing IP framework. The main features provided by SCTP are (A) association setup: An association is a connection that is set up between two endpoints for data transfer, much like a TCP connection. A SCTP association can have multiple addresses at each end. (B) Reliable Data Delivery: Delivers sequenced data in a stream (Elimination of head-of-line blocking): SCTP ensures the sequenced delivery of data with multiple unidirectional streams, without blocking the chunks of data in other direction.

S1AP (S1 Application Part) is the signaling service between E-UTRAN and the Evolved Core network (EPC) that fulfills the S1 Interface functions such as SAE Bearer management functions, Initial context transfer function, Mobility functions for UE, Paging, Reset functionality, NAS signaling transport function, Error reporting, UE context release function, Status transfer. MME S11 Interface support MME supports S11 interface with Serving Gateway. The integrated S11 interface stack consists of IP, UDP and eGTP-C.

SGW (Serving Gateway) protocol includes: S11 control plane stack to support S11 interface with MME, S5/S8 control and data plane stacks to support S5/S8 interface with PGW, S1 data plane stack to support S1 user plane interface with eNodeB, and S4 data plane stack to support S4 user plane interface between RNC of UMTS and SGW of eNodeB.

SGW supports S11 interface with MME and S5/S8 interface with PGW. The integrated control plane stack for these interfaces consists of IP, UDP and eGTP-C.

SGW supports the S1-U interface with eNodeB and S5/S8 data plane interface with PGW. The integrated data plane stack for these interfaces consists of IP, UDP, eGTP-U.

PGW (Packet Data Network Gateway) protocols include S5/S8 control and data plane stacks to support S5/S8 interface with SGW. PGW supports S5/S8 interface with Serving Gateway. The integrated control plane stack for the S5/S8 interfaces consists of IP, UDP, eGTP-C. The integrated data plane stack for the S5/S8 interface consists of IP, UDP, eGTP-U.

In existing 3G and 4G networks, none of the network elements have a good understanding of what is happening in the radio network. For example, there is no accurate picture of how many users are attached to a particular cell, how many users are active or idle, how saturated the cell is, etc.

Without this detailed understanding of the Radio Access Networks (RAN), any video or data optimization solutions are not efficient. In some cases, the optimization solutions can cause under utilization of the radio network or even worse, not address over utilization due to inaccurate modeling.

SUMMARY OF THE INVENTION

According to an embodiment of the invention a method may be provided for evaluating a state of a radio access network (RAN). The method may include parsing control plane massages that are exchanged between the RAN and a core network that is coupled to the RAN; and determining, by an edge bandwidth manager, a current state of the RAN based on the control plane massages.

The determining of the current state may include determining bandwidth utilization in the RAN.

The core network may be a General Packet Radio Service (GPRS) network; and wherein the method may include intercepting control plane messages that are exchanged between a radio network controller (RNC) that may be arranged to control the RAN and a Service GPRS Support Node (SGSN) and intercepting control plane messages exchanged between user equipment (UE) and the SGSN.

The core network may include a Serving Gateway (SGW) and a Mobility Management Entity (MME), wherein the RAN may include an enhanced node B (eNodeB); and wherein the method may include intercepting control plane messages that are exchanged between the eNodeB and the MME and the control plane messages that are exchanged between user equipment (UE) and the MME.

The method may include intercepting the control plane messages by a probe and sending the control plane messages from the probe to the edge bandwidth manager.

The method may include receiving the control plane messages from an aggregator.

The method may include monitoring user plane traffic that is exchanged between the RAN and the core network.

The method may include determining, based on the control plane massages and the user traffic plane, a bandwidth utilization of a cell of the RAN.

The method may include evaluating an available bandwidth of a cell of the RAN.

The method may include detecting a potential congestion situation.

The determining of the current state of the RAN may include determining, about at least one cell of the RAN, at least four parameters of the following parameters: cell identifier (ID); routing Area Code; Radio Network Controller (RNC) ID; NodeB ID; total number of active users; total number of idle users; total number of packet data protocol (PDP) contexts; maximum downlink bandwidth; maximum uplink bandwidth; aggregate downlink bandwidth in use; and aggregate uplink bandwidth in use.

The method may include determining, about at least one session of at least one user of the RAN, at least four parameters of the following parameters: International Mobile Subscriber Identity (IMSI); Pseudo Temporary Mobile Subscriber Identity (P-TMSI); International Mobile station Equipment Identity (IMEI); User Equipment (UE) Internet Protocol (IP) address; Access Point Name (APN); Network layer Service Access Point Identifier (NSAPI) location information; negotiated quality of service (QoS); Mobile Station international Public Switched Telephone Network (PSTN) or Integrated Services Digital Network (ISDN) number; General Packet Radio Services Tunneling Protocol (GPRS) tunnel information; aggregate downlink bandwidth in use and aggregate uplink bandwidth in use.

The method may include estimating a maximal capacity of a cell based on frequency and hardware information.

The core network may be a code divisional multiple access (CDMA) network that may include a Packet Data Serving Node (PDSN) and a Packet Control Function (PCF) that is coupled to a base station controller (BSC); wherein the method may include intercepting control plane messages between at least two entities out of the PCF, the PDSN and the BSC.

According to an embodiment of the invention a computer program product may be provided and may include a non-transitory computer readable medium that stores instructions for: parsing control plane massages that are exchanged between a Radio Access Network (RAN) and a core network that is coupled to the RAN; and determining, by an edge bandwidth manager, a current state of the RAN based on the control plane massages.

The non-transitory computer readable medium may store instructions for determining bandwidth utilization in the RAN.

The core network may be a General Packet Radio Service (GPRS) network; and wherein the non-transitory computer readable medium may store instructions for intercepting control plane messages that are exchanged between a radio network controller (RNC) that may be arranged to control the RAN and a Service GPRS Support Node (SGSN).

The core network may include a Serving Gateway (SGW) and a Mobility Management Entity (MME), wherein the RAN may include an enhanced node B (eNodeB); and wherein the non-transitory computer readable medium may store instructions for intercepting control plane messages that are exchanged between the eNodeB and either one of the SGW and the MME.

The non-transitory computer readable medium may store instructions for intercepting the control plane messages by a probe and sending the control plane messages from the probe to the edge bandwidth manager.

The non-transitory computer readable medium may store instructions for receiving the control plane messages from an aggregator.

The non-transitory computer readable medium may store instructions for monitoring user plane traffic that is exchanged between the RAN and the core network.

The non-transitory computer readable medium may store instructions for determining, based on the control plane massages and the user traffic plane, a bandwidth utilization of a cell of the RAN.

The non-transitory computer readable medium may store instructions for evaluating an available bandwidth of a cell of the RAN.

The non-transitory computer readable medium may store instructions for detecting a potential congestion situation.

The non-transitory computer readable medium may store instructions for determining, about at least one cell of the RAN, at least four parameters of the following parameters: cell identifier (ID); routing Area Code; Radio Network Controller (RNC) ID; NodeB ID; total number of active users; total number of idle users; total number of packet data protocol (PDP) contexts; maximum downlink bandwidth; maximum uplink bandwidth; aggregate downlink bandwidth in use; and aggregate uplink bandwidth in use.

The non-transitory computer readable medium may store instructions for determining, about at least one session of at least one user of the RAN, at least four parameters of the following parameters: International Mobile Subscriber Identity (IMSI); Pseudo Temporary Mobile Subscriber Identity (P-TMSI); International Mobile station Equipment Identity (IMEI); User Equipment (UE) Internet Protocol (IP) address; Access Point Name (APN); Network layer Service Access Point Identifier (NSAPI) location information; negotiated quality of service (QoS); Mobile Station international Public Switched Telephone Network (PSTN) or Integrated Services Digital Network (ISDN) number; General Packet Radio Services Tunneling Protocol (GPRS) tunnel information; aggregate downlink bandwidth in use and aggregate uplink bandwidth in use.

The non-transitory computer readable medium may store instructions for estimating a maximal capacity of a cell based on frequency and hardware information.

The core network may be a code divisional multiple access (CDMA) network that may include a Packet Data Serving Node (PDSN) and a Packet Control Function (PCF) that is coupled to a base station controller (BSC); wherein the non-transitory computer readable medium may store instructions for intercepting control plane messages between at least two entities out of the PCF, the PDSN and the BSC.

According to an embodiment of the invention an edge bandwidth manager may be provided and may include a parser, arranged to parse control plane massages that are exchanged between a Radio Access Network (RAN) and a core network that is coupled to the RAN; and an edge bandwidth management module arranged to determine a current state of the RAN based on the control plane massages.

The edge bandwidth management module may be arranged to determine bandwidth utilization in the RAN. The edge bandwidth management module is a computer that is configured to execute instructions stored on a non-transitory computer readable medium.

The core network may be a General Packet Radio Service (GPRS) network; and the edge bandwidth manager may include an interceptor arranged to intercept control plane messages that are exchanged between a radio network controller (RNC) that may be arranged to control the RAN and a Service GPRS Support Node (SGSN).

The core network may include a Serving Gateway (SGW) and a Mobility Management Entity (MME), wherein the RAN comprises an enhanced node B (eNodeB); and the edge bandwidth manager may include an interceptor arranged to intercept control plane messages that are exchanged between the eNodeB and either one of the SGW and the MME.

The edge bandwidth manager may include an interceptor arranged to intercept the control plane messages by a probe and sending the control plane messages from the probe to the edge bandwidth manager.

The edge bandwidth manager may include an interceptor arranged to that may be arranged to receive the control plane messages from an aggregator.

The edge bandwidth manager may include an interceptor arranged to monitor user plane traffic that is exchanged between the RAN and the core network.

The edge bandwidth manager may be arranged to determine, based on the control plane massages and the user traffic plane, a bandwidth utilization of a cell of the RAN.

The edge bandwidth manager may be arranged to evaluate an available bandwidth of a cell of the RAN.

The edge bandwidth manager may be arranged to detect a potential congestion situation.

The determine of the current state of the RAN may be arranged to determine, about at least one cell of the RAN, at least four parameters of the following parameters: cell identifier (ID); routing Area Code; Radio Network Controller (RNC) ID; NodeB ID; total number of active users; total number of idle users; total number of packet data protocol (PDP) contexts; maximum downlink bandwidth; maximum uplink bandwidth; aggregate downlink bandwidth in use; and aggregate uplink bandwidth in use.

The edge bandwidth manager may be arranged to determine, about at least one session of at least one user of the RAN, at least four parameters of the following parameters: International Mobile Subscriber Identity (IMSI); Pseudo Temporary Mobile Subscriber Identity (P-TMSI); International Mobile station Equipment Identity (IMEI); User Equipment (UE) Internet Protocol (IP) address; Access Point Name (APN); Network layer Service Access Point Identifier (NSAPI) location information; negotiated quality of service (QoS); Mobile Station international Public Switched Telephone Network (PSTN) or Integrated Services Digital Network (ISDN) number; General Packet Radio Services Tunneling Protocol (GPRS) tunnel information; aggregate downlink bandwidth in use and aggregate uplink bandwidth in use.

The edge bandwidth manager may be arranged to estimate a maximal capacity of a cell based on frequency and hardware information.

The core network may be a code divisional multiple access (CDMA) network that may include a Packet Data Serving Node (PDSN) and a Packet Control Function (PCF) that is coupled to a base station controller (BSC); wherein the edge bandwidth manager may include an interceptor arranged to intercept control plane messages between at least two entities out of the PCF, the PDSN and the BSC.

The edge bandwidth manager may be arranged to request a RAN entity to re-allocate a user from one cell to another cell of the RAN.

The method may include performing a bandwidth management operation (such as reducing bandwidth allocation to or from a cell, compressing streams to or from a certain cell) on at least one stream associated with a cell of the RAN if detecting a potential congestion situation related to that cell.

The non-transitory computer readable medium may store instructions for performing a bandwidth management operation on at least one stream associated with a cell of the RAN if detecting a potential congestion situation.

The edge bandwidth manager may be arranged to perform a bandwidth management operation on at least one stream associated with a cell of the RAN if detecting a potential congestion situation.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof may best be understood by reference to the following detailed description when read with the accompanying drawings in which:

FIG. 6 illustrates a method according to an embodiment of the invention;

Figure 1:
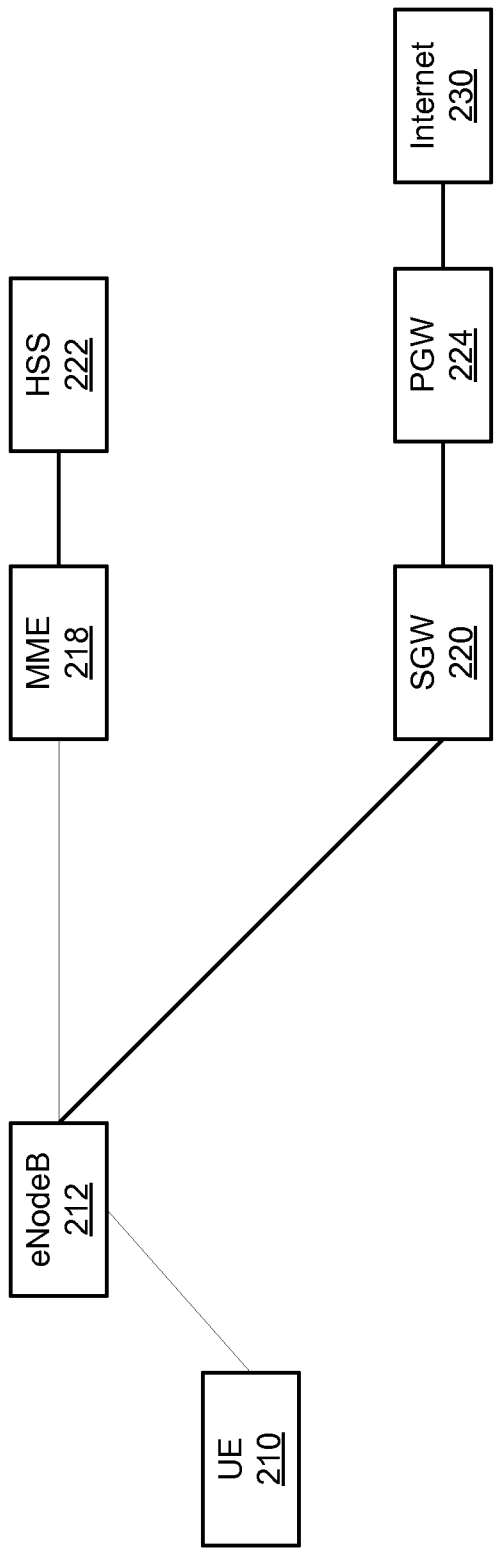
FIG. 1 illustrates a prior art 4G wireless network that is coupled to the Internet.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The term "modeling" can have its regular meaning and can be interpreted as including generation of information that represents a status of an entity. The status can reflect one or a plurality of parameters and their values. A model of an entity of a Radio Access Network can change over time.

The following abbreviations are being used:
APN Access Point Name
EBM Edge Bandwidth Manager
BSC Base Station Controller
eNB eNodeB
GGSN Gateway GPRS Support Node
GPRS General Packet Radio Services
GTP GPRS Tunneling Protocol
IMEI International Mobile station Equipment Identity
IMSI International Mobile Subscriber Identity
ISDN Integrated Services Digital Network
MME Mobility Management Entity
MS Mobile Station
MSISDN MS international PSTN/ISDN number
NAS Non-Access Stratum
NSAPI Network layer Service Access Point Identifier
PCF Packet Control Function
PDN Packet Data Network
PDSN Packet Data Serving Node
P-GW PDN Gateway
PSTN Public Switched Telephone network
P-TMSI Pseudo Temporary Mobile Subscriber Identity
QoS Quality of Service
RAC Routing Area Code
RAN Radio Access Network
RANAP Radio Access Network Application Part
RNC Radio Network Controller
SGW Serving Gateway
SGSN Serving GPRS Support Node
TEID Tunnel End Point Identifier
UE User Equipment Existing optimizing solutions have not taken into account the RAN condition before applying optimization techniques. The suggested systems, computer program products and methods can accurately model a Radio Access Network. By taking into account the RAN condition, it is possible to make better decisions on optimizing the data and video traffic. The right optimization tools can be used depending on whether a particular radio cell is underutilized or saturated.

The disclosed systems, computer program products and methods may not disrupt existing network elements in the core network and in the radio network. The Edge Bandwidth Manager (and the control plane probe) may be transparent to the existing network elements. The existing network elements do not have to be upgraded.

The system, edge bandwidth manager, method and computer program product described in this document is related to dynamically managing bandwidth in a 3G or 4G Radio network based on accurately determining the current state of the RAN.

The herein disclosed solutions involve inserting a new network element between the RAN and a core network. The new network element (hereinafter referred to as Edge Bandwidth Manager) conveniently parses all control plane messages between the RAN and the core network to accurately model the RAN, and determines its current state. This includes determining the current bandwidth utilization in the RAN.

According to various embodiments of the invention a system can be provided and may include a probe, arranged to parse control plane massages that are exchanged between a Radio Access Network (RAN) and a core network that is coupled to the RAN; and an edge bandwidth manager arranged to determine a current state of the RAN based on the control plane massages.

According to an embodiment of the invention an edge bandwidth manager is provided and may include a parser, arranged to parse control plane massages that are exchanged between the RAN and a core network that is coupled to the RAN; and an edge bandwidth management entity arranged to determine a current state of the RAN based on the control plane massages. The data plane traffic may also be taken into account to accurately model the RAN and determine the state of the RAN.

The system, edge bandwidth manager, method and computer program product described herein can accurately model a RAN network, so that any optimization solution takes into account the state of the RAN.

It is noted that the proposed systems and methods are applicable to various types of networks, and especially both 3G and 4G networks. In case of 3G networks, the Edge Bandwidth Manager is placed between the Radio Network Controller (RNC) and the Serving GPRS Support Node (SGSN). The interface between the RNC and the SGSN is referred to as the IuPS interface. The Edge Bandwidth Manager parses all IuPS signaling messages between the RNC and the SGSN. This includes RANAP protocol messages between the SGSN and the RNC and the NAS signaling messages between the SGSN and the end User Equipment (UE).

Figure 2:
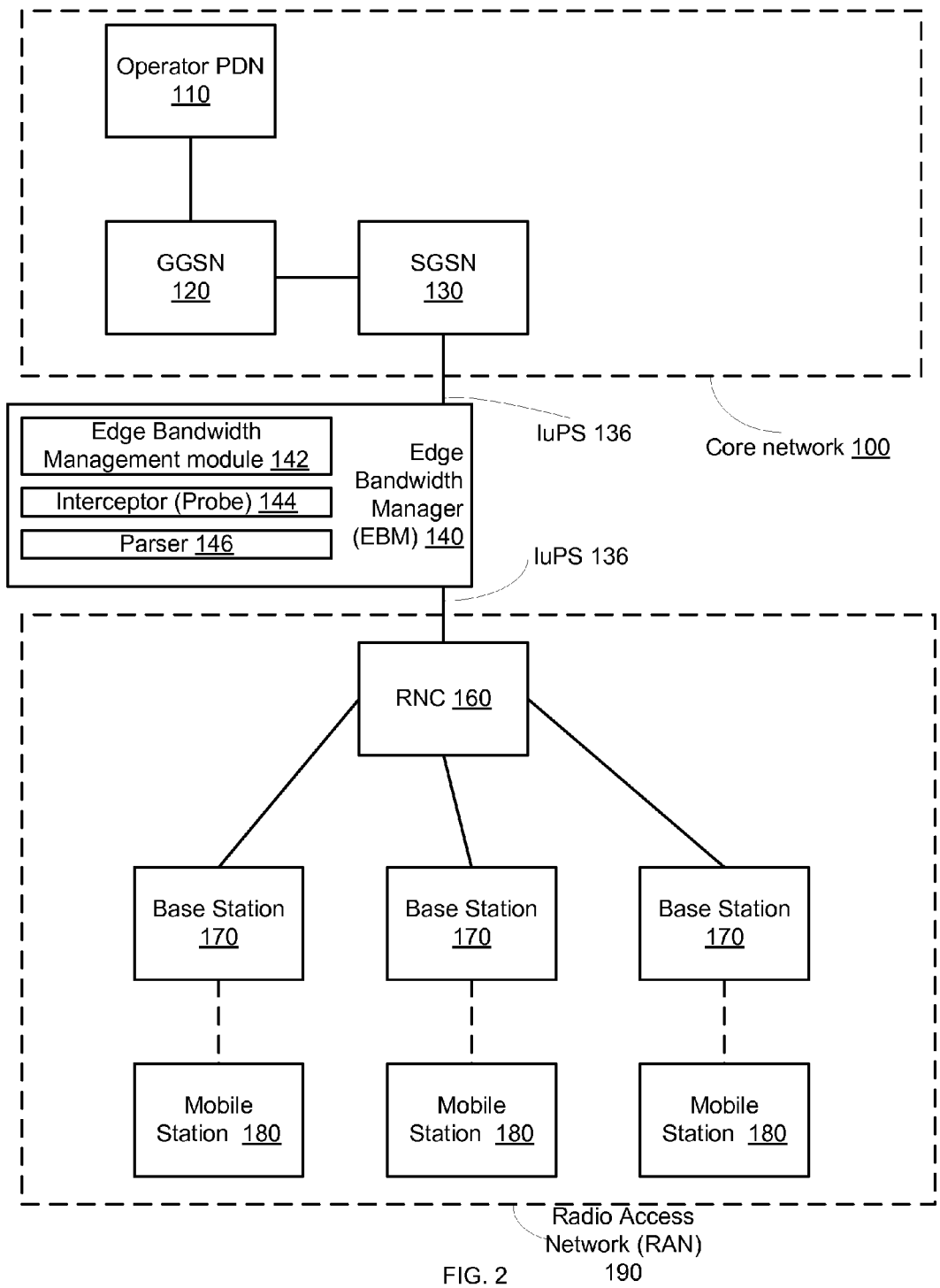
FIG. 2 illustrates a system and its environment according to an embodiment of the invention.

FIG. 2 illustrates Edge Bandwidth Manager (EBM) 140, core network 100 and RAN 190 according to an embodiment of the invention.

EBM 140 may include an interceptor (such as a probe) 144 for intercepting control plane messages, parser 144 for parsing the control plane messages and a edge bandwidth management module 142 for processing the control plane messages in order to evaluate to state of the RAN. EBM 140 is illustrated as being coupled to IuPS 136 interfaces.

It is noted that the EBM 140 may also track after user data sessions and that EBM 140 can also perform various operations in response to the state of the RAN, such as congestion estimation, congestion prevention, and the like.

The EBM 140 may enforce bandwidth management decisions it makes. For example, the EBM 140 models the RAN, and in response to the model it can allocate a target bit rate for each application session. The EBM 140 then tries to enforce the bit rate for the application session using various techniques. The technique used depends on the type of application session. The EBM 140 may control the bit rate on both directions—uplink and downlink. Thus, a stream that is intended to be provided from the core network to the RAN can be compressed, delayed, statistically multiplexed with other streams before it passes towards the RAN. The same applies to streams that are sent from the RAN to the core network. Additionally or alternatively, the EBM 140 can send bit rate allocation values to entities of the core network and/or to entities of the RAN and request these entities to enforce these bit rate allocation values.

The core network 100 is illustrated as including an operator PDN 110 such as the Internet or a private packet data network, GGSN 120 and SGSN 130. The GGSN 120 is coupled between the operator PDN 110 and the SGSN 130.

The RAN 190 includes a RNC 160 that is coupled to multiple base stations 170 that in turn are wirelessly coupled to mobile stations 180.

The EBM 140 can be placed closer to either the SGSN 130 or the RNC 160. There is no restriction on its physical placement. Additionally, the functions of the EBM 140 can be implemented within the SGSN 130 or the RNC 160.

In the case of 4G networks, the EBM 140 can be placed between the eNodeB, the MME/SGW (Serving Gateway).

Figure 3:
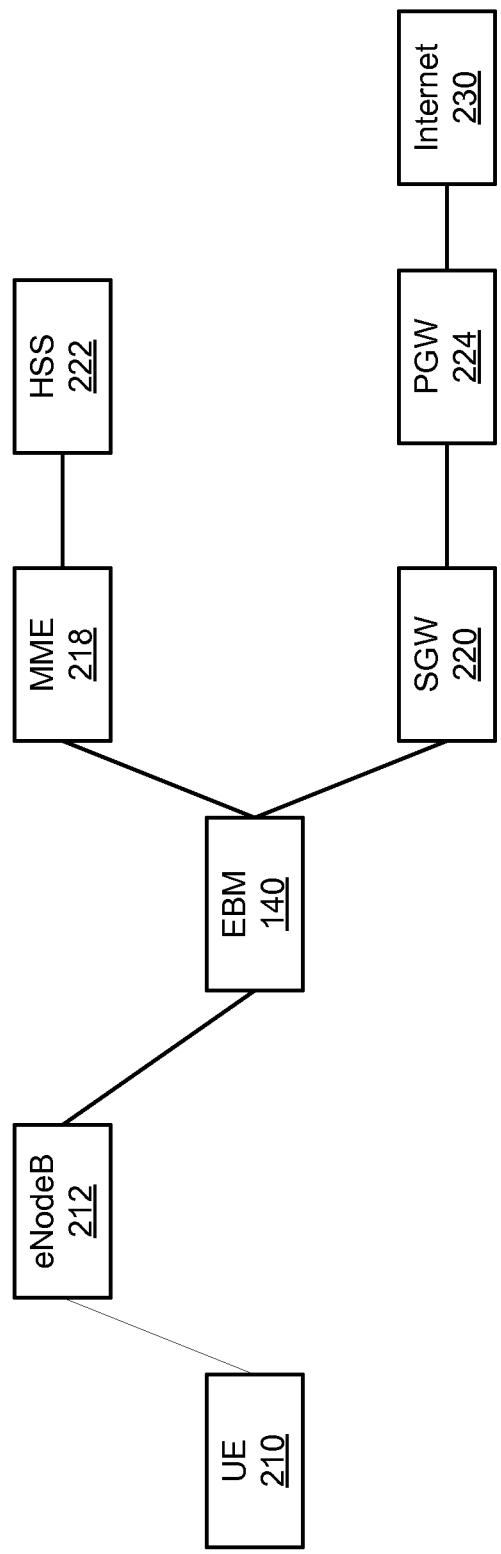
FIG. 3 illustrates a system and its environment according to an embodiment of the invention.

FIG. 3 illustrates EBM 140 as being coupled to eNodeB 212, ePDG 216, MME 218 and SGW 220.

The EBM 140 parses all S1 messages between the eNodeB 212 and the core network (Internet 230). This includes S1-AP messages between the MME 218 and the eNodeB 212, and the NAS signaling messages between the MME 218 and the UE 210.

The EBM 140 can be placed closer to either the core network nodes like the MME 218 and the SGW 220 or closer to the eNodeB 212. Additionally, the EBM can be implemented within these devices.

The UE 210 is also sometimes called the Mobile Station (MS). It can be any device (including cell phones, laptop modems) that can attach to a 3G or a 4G network.

FIGS. 2 and 3 illustrate in-path configurations according to two embodiments of the invention, in which all traffic between the RAN and the core network passes through the EBM 140.

It is also possible to place the EBM in an out-of-path mode, where the EBM is co-located with an aggregation router/switch on the backhaul link. The aggregation router is configured to send specific packets (or in some cases all packets) to the Edge Bandwidth Manager. Once the EBM is done with parsing the messages, they are sent back to the aggregation router and from there to the original destination. The out-of-path approach has an advantage that if the EBM fails, it does not cause any impact to the rest of the network. An out-of-path approach in a 3G wireless network is shown in FIG. 4.

Figure 4:
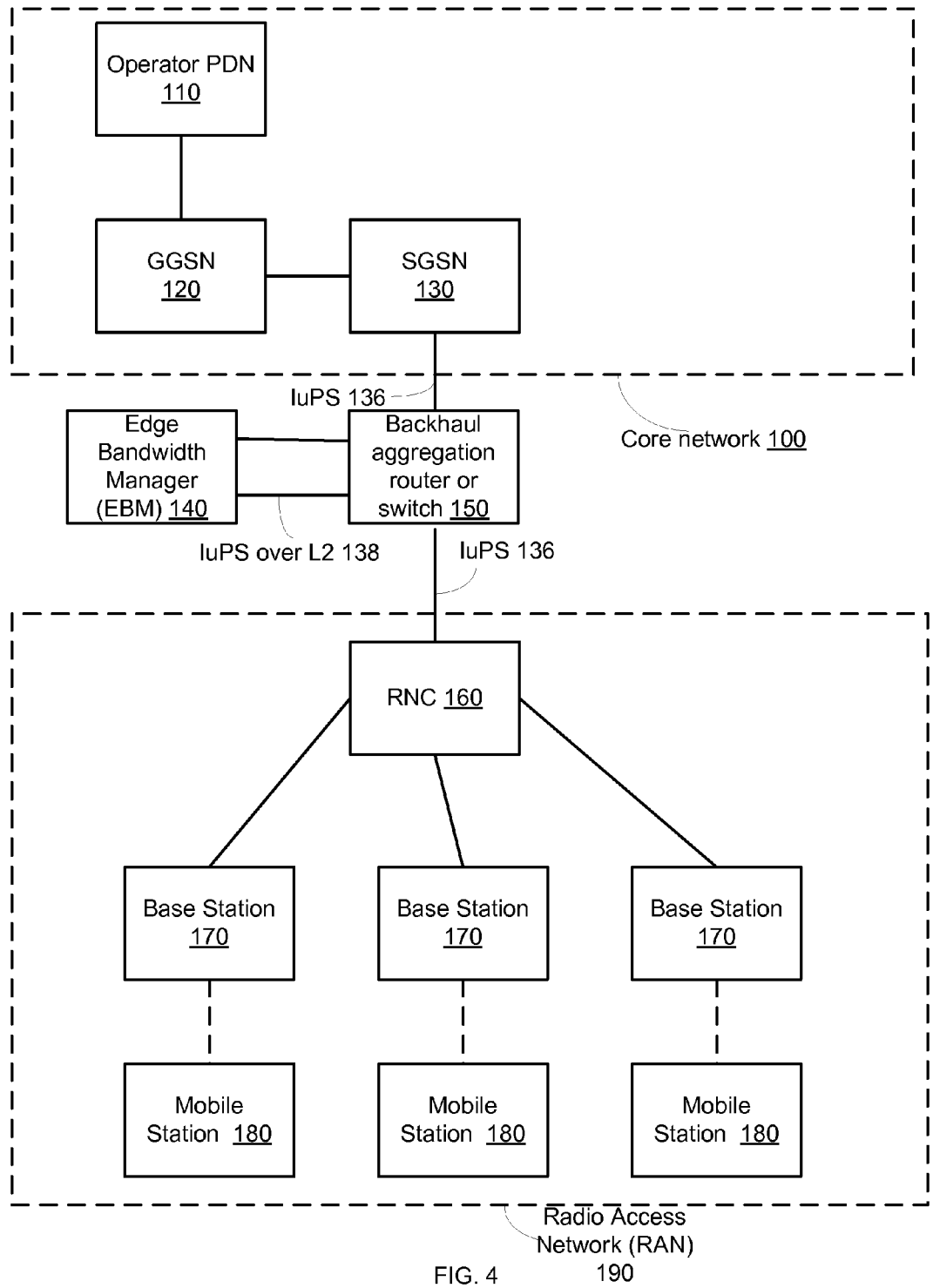
FIG. 4 illustrates a system and its environment according to an embodiment of the invention.

FIG. 4 illustrates an out-of-path approach for 3G networks, according to an embodiment of the invention. FIG. 4 differs from FIG. 2, by having a backhaul aggregator router or switch 150 coupled between the SGSN 130 and the RNC 160 (instead of the EBM 140 being coupled between these elements) and having the EBM 140 coupled to the backhaul aggregator router or switch 150.

The out-of-path approach can also be achieved using an Optical Bypass Switch or Network Tap.

The out-of-path configuration can also be applied to the 4G wireless network.

According to another embodiment of the invention the EBM may also monitor user plane traffic, both uplink and downlink, between the RAN and the core network.

In case of 3G networks, the EBM monitors the user plane traffic on the Iu-U interface between the RNC and the SGSN or between RNC and the GGSN, in case Direct Tunnel architecture is used. In case of 4G networks, the EBM monitors the user plane traffic on the S1-U interface between the eNodeB and the Serving Gateway.

The EBM at any time maintains an accurate picture of the RAN. On a per radio cell basis, it maintains the following information.

Cell Information: Cell ID, Routing Area Code, RNC ID, NodeB ID, Total number of Active Users, Total number of Idle Users, Total number of PDP contexts, Maximum downlink bandwidth, Maximum uplink bandwidth, Aggregate downlink bandwidth in use, and Aggregate uplink bandwidth in use.

Each piece of information described above may be obtained by parsing the relevant control plane messages and the data plane traffic. For example, in a 3G GSM network, the Cell ID is obtained from the NAS and RANAP messages exchanged on the IuPS interface. The number of active and idle users in a cell is determined based on observing state transitions for each UE in the cell. The bandwidth consumption parameters, is determined by parsing the data plane and figuring out how much bandwidth is being consumed at any point.

A per-radio cell information such as the one described above may be used by the EBM to figure out how much additional capacity is available in the cell. The radio cell is also called a "Sector". Note that "Cell" and "Sector" are used interchangeably in this document.

A typical base station configuration has three sectors. Six sectors per base station are also possible. It also allows the EBM to predict congestion situations and take corrective actions, thereby preventing congestion in a particular cell. In addition, the information present in the table above can be used to move certain users from a cell which is saturated to another cell that is underutilized, if the user is a location where the two cells overlap.

The per-cell information may be is constantly updated in real-time based on the mobility and other signaling between the RAN and the core network and the data traffic consumed by the users. The per-cell information listed above is not exhaustive.

The EBM also maintains the user session state that may include at least some (or all) of the following parameters: International Mobile Subscriber Identity (IMSI); Pseudo Temporary Mobile Subscriber Identity (P-TMSI); International Mobile station Equipment Identity (IMEI); User Equipment (UE) Internet Protocol (IP) address; Access Point Name (APN); Network layer Service Access Point Identifier (NSAPI) location information; negotiated quality of service (QoS); Mobile Station international Public Switched Telephone Network (PSTN) or Integrated Services Digital Network (ISDN) number; General Packet Radio Services Tunneling Protocol (GPRS) tunnel information; aggregate downlink bandwidth in use and aggregate uplink bandwidth in use.

Each piece of information described in the previous paragraph may be obtained by parsing the relevant control plane messages and the traffic generated by the user. For example, in a 3G GSM network, the subscriber IMSI is obtained by parsing the Attach Request NAS message from the UE to the SGSN. Another example is the APN information that is obtained from the Activate PDP Context Request NAS message sent from the UE to the SGSN.

Per-session information may be is constantly updated in real-time based on the mobility and other signaling between the RAN and the core network and the data traffic consumed by each session. The information listed above is not exhaustive.

As mentioned previously, the EBM constructs per-cell and per-cell information (e.g. as described in Tables 1 and 2) by processing control and user plane traffic between the RAN and the core network.

The following describes in more details a method for constructing this information, according to an embodiment of the invention.

1. When the UE is powered on, it attaches to an SGSN. One of the first messages it sends is the Attach Request message. The subscriber identity and the location information are available in the Attach Request Message.
2. There are subsequent Identity Request and Check procedures, where the subscriber's actual IMSI and the IMEI information is obtained.
3. The session information is obtained when the subscriber sets up a session using the Activate PDP context procedure. This information obtained includes, the user's APN, NSAPI, requested QoS, UE IP address, and etc.,
4. The tunnel information for the GTP tunnel between the RNC and the SGSN is obtained by parsing the RANAP messages related to the RAB Assignment procedure. These messages are exchanged between the RNC and the SGSN.
5. The EBM also parses messages related to the UE detaching or tearing down a session.

As users move around in the radio network, the EBM keeps track of which cell each user is at any time, so that it knows accurately how many users are in a particular radio cell.

The following describes how the EBM keeps track of mobility related information, according to an embodiment of the invention:

1. When the UE is about to move into a new routing area (tracking area in case of 4G networks), the EBM parses all messages related to routing area update procedure. This allows the EBM to figure out which cell the user is moving in to at any time. This also allows the EBM to keep track of the current cell the UE is in at any time.
2. When the UE is about to move in to a new location that results in a change of RNC, the EBM parses all inter-RNC handover messages. This allows the EBM to get updated GTP tunnel information and information exchanged between the source RNC and the target RNC.
3. The EBM also parses handover messages related to inter-NodeB handovers, so that it has the current routing area and cell information.
4. The EBM also processes all messages related to location reporting between the RNC and the SGSN.

In addition to processing the control plane messages, the EBM may also monitor how much data traffic (both downlink and uplink) is being sent/consumed by each user on the user plane. By mapping each user's session to a cell, and the downlink and uplink bandwidth associated with each session, the Edge Bandwidth Managers computes the aggregate bandwidth that is being consumed at any time for each cell.

The maximum bandwidth available per cell is configured on the EBM on a per-cell basis. There are a couple of alternate options instead of having to configure the EBM on a per-cell basis. In the first option, the EBM obtains this information from a central database through LDAP or similar mechanism. The central database has information on how much total bandwidth is available per cell. In the second option, the EBM obtains information about the base station, more specifically what frequency it is configured with, how many antennas are installed, etc., and then figures out the total bandwidth available on the cell based on the base station information. The frequency range, and the antenna configuration is used by the EBM to figure out the maximum bandwidth available per cell. Based on the total bandwidth available in a cell and the current bandwidth consumption in the cell, the EBM figures out if a particular cell is saturated or underutilized.

By looking at the mobility patterns, the EBM is also able to predict congestion in a cell before it happens. For example, when it sees a number of users being handed over from one cell to another, it can predict the impact on the target cell before the users move to the target cell. Based on the impact to the target cell, the EBM can start taking corrective actions before the handover event happens. This allows the EBM to predict congestion and prevent it before it happens in any particular cell. Another example is based on idle to active mode transitions. When the EBM sees a user or a number of users transitioning from the idle to active mode, it can predict the impact of the new sessions on the cell and start taking corrective actions if it predicts congestion on the cell.

For 4G networks, the EBM may process the messages corresponding to NAS attach procedure, identity request procedure, S1 GTP tunnel setup messages, inter-eNodeB handovers and tracking area update procedures. This is very similar to what is described above in 3G.

The solution described in this document does not restrict the placement of the EBM. The EBM functionality can be split into a plurality (for example—two) network elements, where the main bandwidth management and RAN assessment function (such as the edge bandwidth management module 142 of FIG. 2) may be centrally located and a control plane probe 144 that monitors RAN related signaling is placed much closer to/or in the radio network. For example, the EBM function can be placed between the GGSN and the operator.

Figure 5:
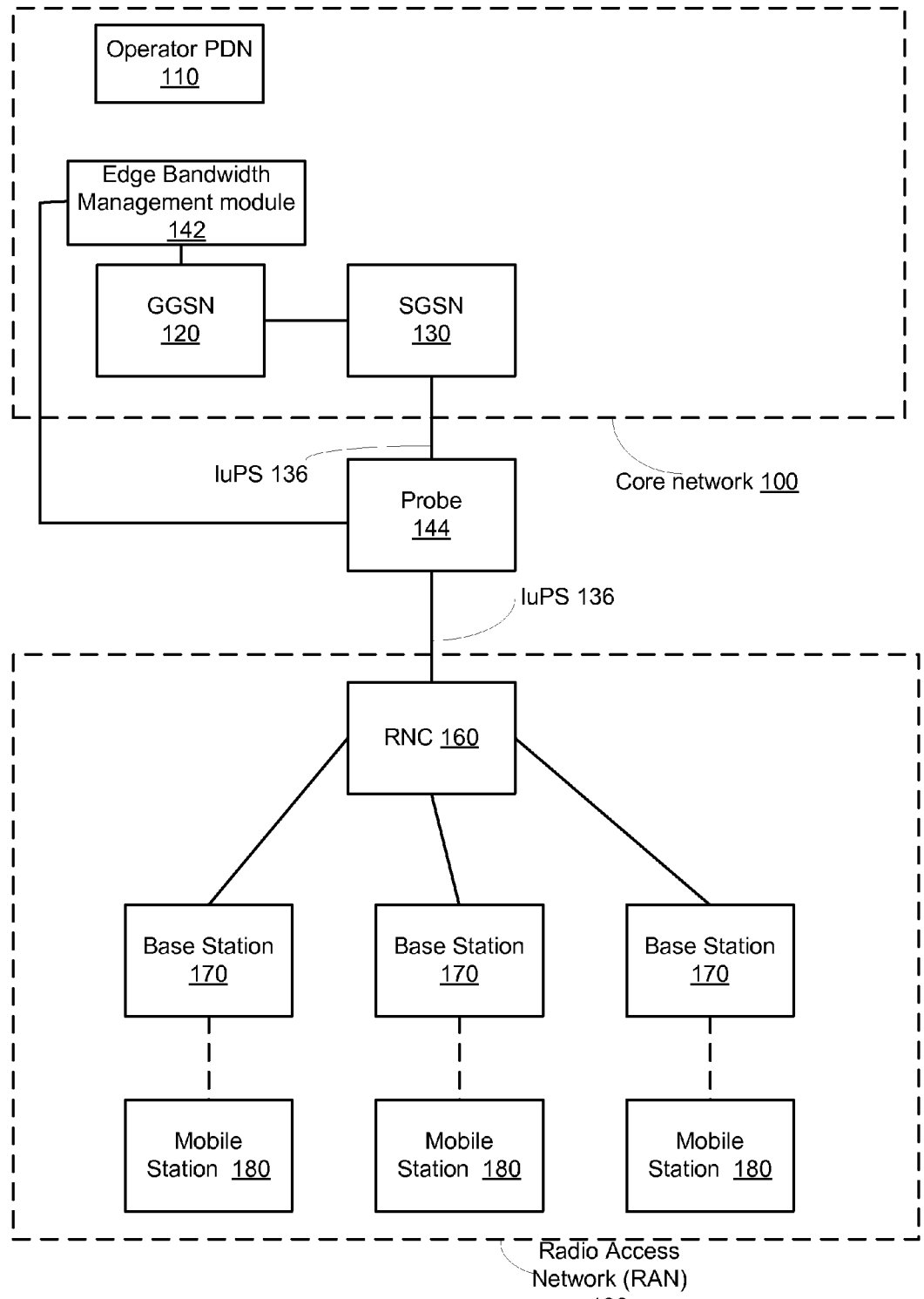
FIG. 5 illustrates a system and its environment according to an embodiment of the invention.

The Gi interface can be used for forwarding packets to external networks, including the Internet. The control plane probe 144 can be placed on the interface between the RAN and the core network—as illustrated in FIG. 5. FIG. 5 illustrates an edge bandwidth management module 142 that is being coupled between the operator PDN 110 and the GGSN 120, while the probe 144 is coupled between the SGSN 130 and the RNC 160.

According to such an embodiment of the invention, the control plane probe 144 parses all signaling messages between the RAN 190 and the core network and provides a summary of the RAN conditions to the Edge Bandwidth Management module 142. It is also possible for the control plane probe to just forward a copy of all control plane messages to the Edge Bandwidth Management module 142. In this case, the control plane messages are actually processed on the Edge Bandwidth Management module to model the RAN 190. The control plane probe 144 does not process these messages. In case of 4G networks, the EBM is placed on the SGi interface between the PGW and the operator services/Internet with the control plane probe on the S1 interface.

When the control plane is placed on the interface between the RAN and the core network, it can be placed either close to the core network nodes like the SGSN, SGW or MME or closer to the RAN network. It can also be placed inside the RAN network between the base stations and the RNC.

The control plane probe shown in FIG. 4 can be also co-located with existing network elements like the MME, the SGSN or the RNC. Then it becomes a software function on the existing network elements.

FIG. 6 illustrates method 500 according to an embodiment of the invention. Method 500 is for evaluating a state of a radio access network (RAN).

Method 500 may start by stage 510 of intercepting or receiving control plane messages that are exchanged between the RAN and a core network that is coupled to the RAN.

Stage 510 may include intercepting the control plane messages or receiving the control messages from another entity (such as an aggregator or a probe) that intercepts the control plane messages. The intercepting is done in a non-intrusive manner in the sense that the control plane messages arrive to their intended destination without being changed.

This is partially illustrated by stages 512 and 514. Stage 512 includes intercepting the control plane messages by a probe and sending the control plane messages from the probe to the edge bandwidth manager. The probe can be include din the edge bandwidth manager, located at the same location, positioned in a remote location, and the like.

Stage 514 includes receiving the control plane messages from an aggregator.

The core network can be a General Packet Radio Service (GPRS) network. Stage 510 may include intercepting control plane messages that are exchanged between a radio network controller (RNC) that is arranged to control the RAN and a Service GPRS Support Node (SGSN).

The core network can be a Serving Gateway (SGW) and a Mobility Management Entity (MME), wherein the RAN comprises an enhanced node B (eNodeB). Stage 510 may include intercepting control plane messages that are exchanged between the eNodeB and either one of the SGW and the MME.

Stage 510 is followed by stage 520 of parsing the control plane massages (that were exchanged between the RAN and the core network).

Stage 520 is followed by stage 530 of determining, by an edge bandwidth manager, a current state of the RAN based on the control plane massages.

Figure 7:
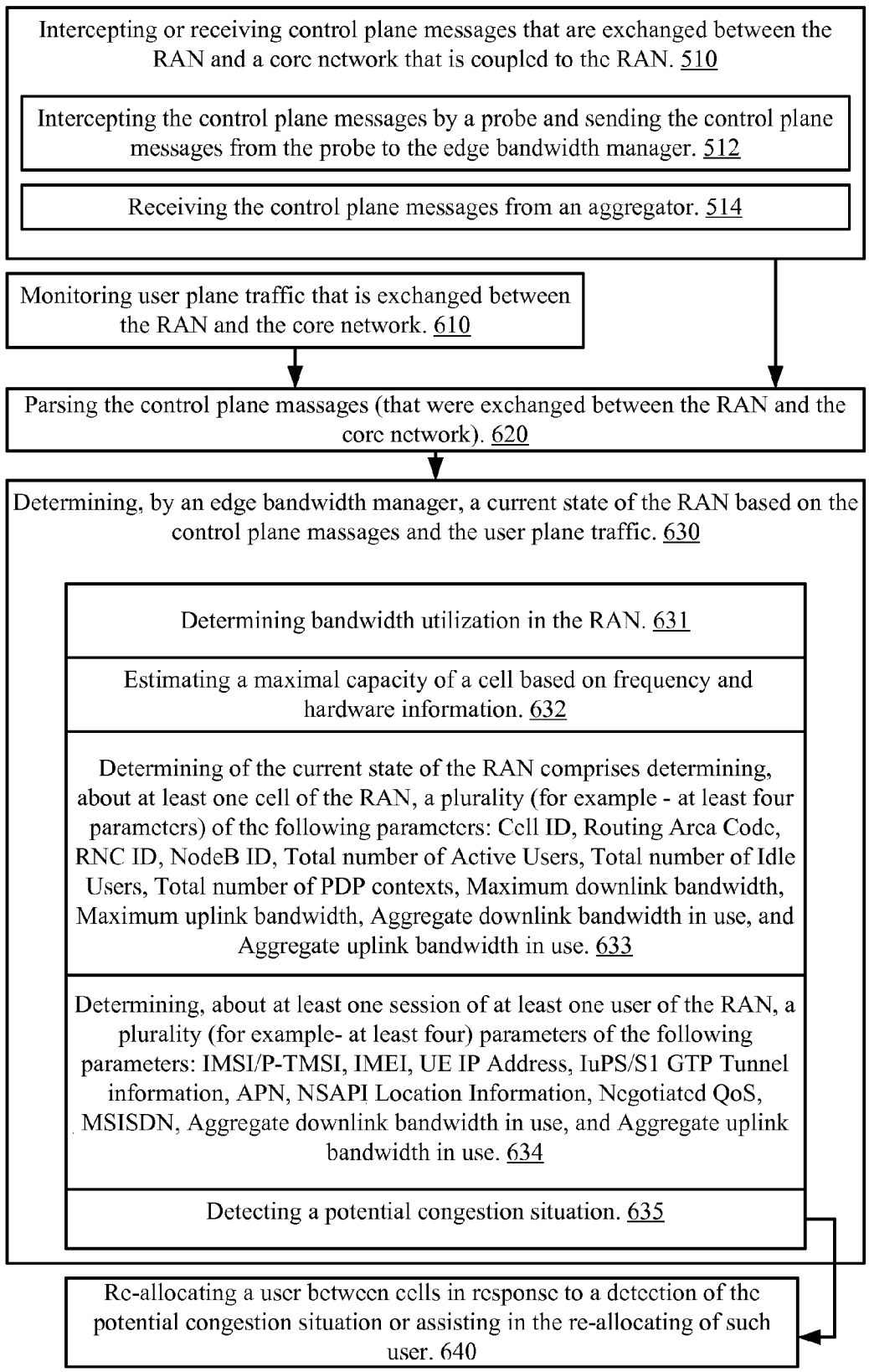
FIG. 7 illustrates a method according to an embodiment of the invention.

FIG. 7 illustrates method 600 according to an embodiment of the invention. Method 600 is for evaluating a state of a radio access network (RAN).

Method 600 may start by stages 510 and 610. Stage 510 may include intercepting or receiving control plane messages that are exchanged between the RAN and a core network that is coupled to the RAN.

Stage 610 may include monitoring user plane traffic that is exchanged between the RAN and the core network.

Stages 510 and 610 are followed by stage 520 of parsing the control plane massages (that were exchanged between the RAN and the core network).

Stage 520 is followed by stage 630 of determining, by an edge bandwidth manager, a current state of the RAN based on the control plane massages and the user plane traffic.

Stage 630 may include stage 631 of determining bandwidth utilization in the RAN.

Stage 631 may include determining the aggregate bandwidth, the available bandwidth or any bandwidth statistics per RAN, per cell, per session, per a group of users and the like.

Stage 630 may include stage 632 of estimating a maximal capacity of a cell based on frequency and hardware information.

Stage 630 may include stage 633 of determining of the current state of the RAN comprises determining, about at least one cell of the RAN, a plurality (for example—at least four parameters) of the following parameters: Cell ID, Routing Area Code, RNC ID, NodeB ID, Total number of Active Users, Total number of Idle Users, Total number of PDP contexts, Maximum downlink bandwidth, Maximum uplink bandwidth, Aggregate downlink bandwidth in use, and Aggregate uplink bandwidth in use.

Stage 630 may include stage 634 of determining, about at least one session of at least one user of the RAN, a plurality (for example—at least four) parameters of the following parameters: IMSI/P-TMSI, IMEI, UE IP Address, IuPS/S1 GTP Tunnel information, APN, NSAPI Location Information, Negotiated QoS, MSISDN, Aggregate downlink bandwidth in use, and Aggregate uplink bandwidth in use Stage 630 may include stage 635 of detecting a potential congestion situation.

Stage 635 may be followed by stage 640 of re-allocating a user between cells in response to a detection of the potential congestion situation or assisting in the re-allocating of such user. The re-allocating can include requesting a RAN entity (such as a controller) to perform the re-allocation.

According to an embodiment of the invention a computer program product is provided. The computer program product includes a non-transitory computer readable medium that may store instructions for parsing control plane massages that are exchanged between a Radio Access Network (RAN) and a core network that is coupled to the RAN; and determining, by an edge bandwidth manager, a current state of the RAN based on the control plane massages.

The non-transitory computer readable medium may store instructions for at least one of the following:

1. Determining bandwidth utilization in the RAN.

2. Intercepting the control plane messages by a probe and sending the control plane messages from the probe to the edge bandwidth manager.
3. Receiving the control plane messages from an aggregator.
4. Monitoring user plane traffic that is exchanged between the RAN and the core network.
5. Determining, based on the control plane massages and the user traffic plane, a bandwidth utilization of a cell of the RAN.
6. Evaluating an available bandwidth of a cell of the RAN.
7. Detecting a potential congestion situation.
8. Re-allocating a user between cells in response to a detection of the potential congestion situation.
9. Estimating a maximal capacity of a cell based on frequency and hardware information.
10. Determining, about at least one cell of the RAN, multiple (for example—at least four) parameters of the following parameters: cell identifier (ID); routing Area Code; Radio Network Controller (RNC) ID; NodeB ID; total number of active users; total number of idle users; total number of packet data protocol (PDP) contexts; maximum downlink bandwidth; maximum uplink bandwidth; aggregate downlink bandwidth in use; and aggregate uplink bandwidth in use.
11. Determining, about at least one session of at least one user of the RAN, at least four parameters of the following parameters: International Mobile Subscriber Identity (IMSI); Pseudo Temporary Mobile Subscriber Identity (P-TMSI); International Mobile station Equipment Identity (IMEI); User Equipment (UE) Internet Protocol (IP) address; Access Point Name (APN); Network layer Service Access Point Identifier (NSAPI) location information; negotiated quality of service (QoS); Mobile Station international Public Switched Telephone Network (PSTN) or Integrated Services Digital Network (ISDN) number; General Packet Radio Services Tunneling Protocol (GPRS) tunnel information; aggregate downlink bandwidth in use and aggregate uplink bandwidth in use.

The core network can be a General Packet Radio Service (GPRS) network and the non-transitory computer readable medium can store instructions for intercepting control plane messages that are exchanged between a radio network controller (RNC) that is arranged to control the RAN and a Service GPRS Support Node (SGSN).

The core network can be a Serving Gateway (SGW) and a Mobility Management Entity (MME), the RAN comprises an enhanced node B (eNodeB). The non-transitory computer readable medium can store instructions for intercepting control plane messages that are exchanged between the eNodeB and either one of the SGW and the MME.

Figure 8:
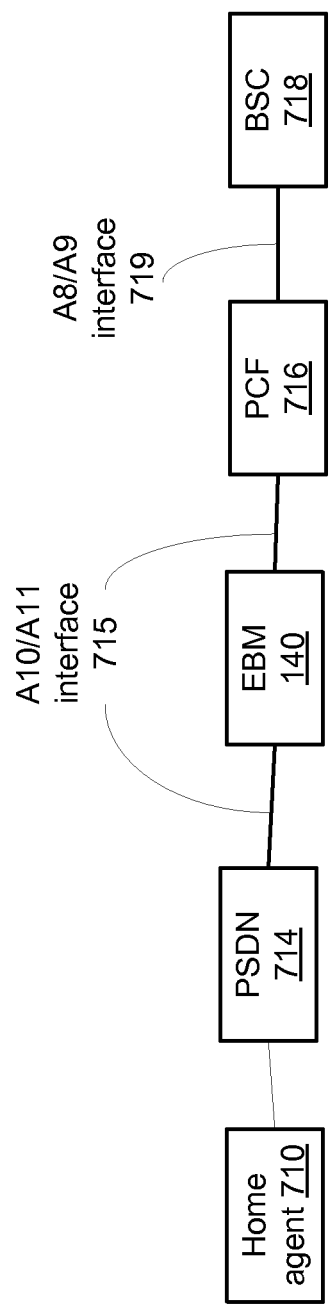
FIG. 8 illustrates a system and its environment according to an embodiment of the invention.
Figure 9:
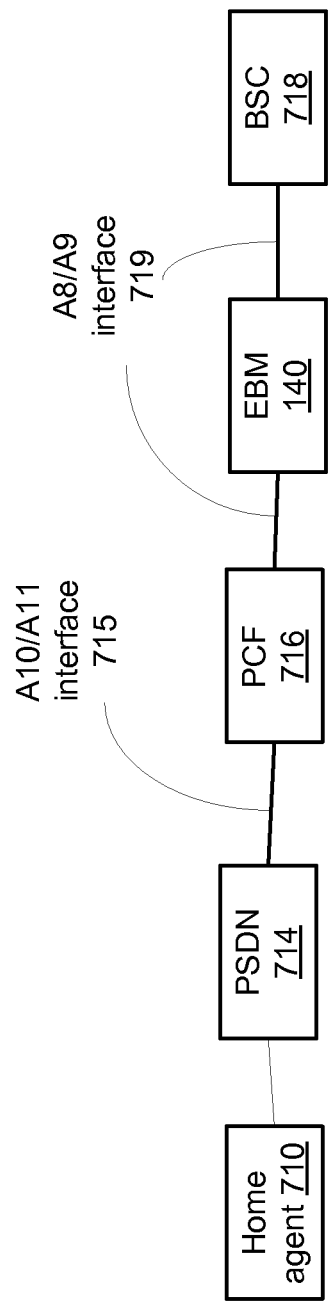
FIG. 9 illustrates a system and its environment according to an embodiment of the invention.

FIGS. 8 and 9 illustrate EBM 140 in various CDMA 3G networks, according to various embodiments of the invention. The CDMA 3G network includes a Base Station Controller (BSC) 718, a Packet Control Function (PCF) 716, a Packet Data Serving Node (PDSN) 714 and a home agent 710.

FIG. 7 illustrates the EBM 140 as being placed on the A10/A11 interface between the PCF 716 and the PDSN 714. The EBM 140 may parse all the A11 control plane messages exchanged between the PCF 716 and the PDSN 714 to model the RAN that includes the BSC 718 and the base stations controlled by the BSC.

FIG. 8 illustrates the EBM 140 as being placed on the A8/A9 interface between the BSC 718 and the PCF 716. The EBM may parse the A9 control plane messages exchanged between the BSC 718 and the PCF 716.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A method for evaluating a state of a radio access network (RAN), the method comprising:
parsing, by a parser of an edge bandwidth manager, control plane messages that are exchanged between the RAN and a core network that is coupled to the RAN;
determining, by an edge bandwidth management module of the edge bandwidth manager, a current state of the RAN based on the control plane messages; wherein the edge bandwidth manager does not belong to the RAN and does not belong to the core network; wherein the determining comprises detecting by the edge bandwidth manager a potential congestion situation at a target cell of the RAN in response to a detection of users transitioning from an idle mode to active mode and an estimation that the transitioning will cause congestion; and
detecting by the edge bandwidth manager a potential congestion situation at a target cell of the RAN in response to a number of users being handed over from one cell to the target cell, wherein the detecting occurs before the users move to the target cell wherein the number of users exceeds two; and
wherein the edge bandwidth management module is a computer that is configured to execute instructions stored on a non-transitory computer readable medium.

2. The method according to claim 1, wherein the core network comprises a Serving Gateway (SGW) and a Mobility Management Entity (MME), wherein the RAN comprises an enhanced node B (eNodeB); and wherein the method comprises intercepting control plane messages that are exchanged between the eNodeB and the MME and the control plane messages that are exchanged between user equipment (UE) and the MME.

3. The method according to claim 1, comprising receiving the control plane messages from a backhaul aggregator router or switch.

4. The method according to claim 1, wherein the determining of the current state of the RAN comprises determining, about at least one cell of the RAN, the following parameters: cell identifier (ID); routing Area Code; Radio Network Controller (RNC) ID; NodeB ID; total number of active users; total number of idle users; total number of packet data protocol (PDP) contexts; maximum downlink bandwidth; maximum uplink bandwidth; aggregate downlink bandwidth in use; and aggregate uplink bandwidth in use.

5. The method according to claim 1, comprising determining, about at least one session of at least one user of the RAN, the following parameters: International Mobile Subscriber Identity (IMSI); Pseudo Temporary Mobile Subscriber Identity (P-TMSI); International Mobile station Equipment Identity (IMEI); User Equipment (UE) Internet Protocol (IP) address; Access Point Name (APN); Network layer Service Access Point Identifier (NSAPI) location information; negotiated quality of service (QoS); Mobile Station international Public Switched Telephone Network (PSTN) or Integrated Services Digital Network (ISDN) number;

General Packet Radio Services Tunneling Protocol (GPRS) tunnel information; aggregate downlink bandwidth in use and aggregate uplink bandwidth in use.

6. The method according to claim 1, comprising requesting, by the edge bandwidth manager from a RAN entity to re-allocate a user between cells in response to a detection of the potential congestion situation.

7. A computer program product that comprises a non-transitory computer readable medium that stores instructions for: parsing control plane messages that are exchanged between a Radio Access Network (RAN) and a core network that is coupled to the RAN; and determining, by an edge bandwidth manager that does not belong to the RAN and does not belong to the core network, a current state of the RAN based on the control plane messages; wherein the determining comprises detecting by the edge bandwidth manager a potential congestion situation at a target cell of the RAN in response to a detection of users transitioning from an idle mode to active mode and an estimation that the transitioning will cause congestion; and detecting by the edge bandwidth manager a potential congestion situation at a target cell of the RAN in response to a number of users being handed over from one cell to the target cell, wherein the detecting occurs before the users move to the target cell wherein the number of users exceeds two.

8. The computer program product according to claim 7, wherein the core network comprises a Serving Gateway (SGW) and a Mobility Management Entity (MME), wherein the RAN comprises an enhanced node B (eNodeB); and wherein the non-transitory computer readable medium stores instructions for intercepting control plane messages that are exchanged between the eNodeB and either one of the SGW and the MME.

9. The computer program product according to claim 7, wherein the non-transitory computer readable medium stores instructions for receiving the control plane messages from a backhaul aggregator server or switch.

10. The computer program product according to claim 7, wherein the non-transitory computer readable medium stores instructions for determining, about at least one cell of the RAN, the following parameters: cell identifier (ID); routing Area Code; Radio Network Controller (RNC) ID; NodeB ID; total number of active users; total number of idle users; total number of packet data protocol (PDP) contexts; maximum downlink bandwidth; maximum uplink bandwidth; aggregate downlink bandwidth in use; and aggregate uplink bandwidth in use.

11. The computer program product according to claim 7, wherein the non-transitory computer readable medium stores instructions for determining, about at least one session of at least one user of the RAN, the following parameters: International Mobile Subscriber Identity (IMSI); Pseudo Temporary Mobile Subscriber Identity (P-TMSI); International Mobile station Equipment Identity (IMEI); User Equipment (UE) Internet Protocol (IP) address; Access Point Name (APN); Network layer Service Access Point Identifier (NSAPI) location information; negotiated quality of service (QoS); Mobile Station international Public Switched Telephone Network (PSTN) or Integrated Services Digital Network (ISDN) number; General Packet Radio Services Tunneling Protocol (GPRS) tunnel information; aggregate downlink bandwidth in use and aggregate uplink bandwidth in use.

12. The computer program product according to claim 7, wherein the non-transitory computer readable medium stores instructions for requesting, by the edge bandwidth manager from a RAN entity to re-allocate a user between cells in response to a detection of the potential congestion situation.

* * * * *